United States Patent [19]

Hong et al.

[11] Patent Number: 5,023,292

[45] Date of Patent: Jun. 11, 1991

[54] TIRE COMPOUNDS

[75] Inventors: Sung W. Hong, Cheshire; Edward L. Wheeler, Watertown, both of Conn.

[73] Assignee: Uniroyal Chemical Company, Inc., Middlebury, Conn.

[21] Appl. No.: 414,807

[22] Filed: Sep. 29, 1989

[51] Int. Cl.$^5$ .......................... C08K 3/22; C08K 5/22; C08L 9/06; C08L 61/06
[52] U.S. Cl. .................................. 524/432; 152/547; 525/134; 525/139
[58] Field of Search ................ 524/432; 525/139, 134; 152/547, 209 R

[56] References Cited

U.S. PATENT DOCUMENTS

| 3,256,137 | 6/1966 | Danielson | 161/241 |
| 3,266,970 | 8/1966 | Paul | 161/241 |
| 3,281,311 | 10/1966 | Paul | 161/241 |
| 4,532,291 | 7/1985 | Hayashi et al. | 524/504 |
| 4,675,355 | 6/1987 | Hirata et al. | 524/495 |

OTHER PUBLICATIONS

Abstract of Japanese Patent 59-204,636, Tanibuchi et al, 11/84.
Chemical Abstracts 95:26446m, p. 59 (1981).
Chemical Abstracts 100:69670u, p. 67 (1984).

Primary Examiner—Allan M. Lieberman
Attorney, Agent, or Firm—Glenn E. Karta

[57] ABSTRACT

Tire compounds containing an elastomer, and a resin cured with 1-aza-5-methylol-3,7-dioxabicyclo (3,3,0) octane are disclosed, as well as methods for the preparation of such compounds.

14 Claims, No Drawings

TIRE COMPOUNDS

BACKGROUND OF THE INVENTION

1. Field of the Invention

This invention relates to radial ply tires or high performance tire compounds with higher modulus for hard apex, chafer (rim flange) and tread compound for improved handling and uniformity.

In the recent development of radial ply tires or high performance tires, the requirements for tire materials have become more and more specialized and diversified to achieve specific dynamic properties. For example, certain commercial superfiller radial ply and high performance tires have hard chafer and an apex with Shore A Hardness greater than 90 for improved ride and handling, which is achieved by compounds highly filled with carbon black to achieve high hardness. However, if there is too much high structure black in a compound, processing, i.e., mixing and extruding will be more difficult due to the higher Mooney Viscosity resulting from the good dispersion of carbon black.

With high performance tread, traction is most important in order to obtain safe and better handling tires even though the tread wear becomes poorer. In order to improve handling, a higher cornering coefficient is required. Higher cornering coefficient tires can be obtained from either a higher dynamic modulus tread or a lower angle of steel belts. Lower angle of steel belts may not be a good choice because of irregular wear problems and a harsher ride. Therefore, the better choice is to develop higher dynamic modulus tread to provide higher cornering coefficient for better handling. Higher dynamic modulus tread compounds can be achieved with an excessive amount of high structure, super abrasion furnace carbon black and lower oil. However, this lower oil, higher filler compound is extremely difficult to mix and extrude even though the compound provides better wear resistance.

Thus, it would be desirable to possess a tire with higher modulus for hard apex, chafer and tread compound for improved handling and uniformity as well as reduced problems of short scorch times during cure.

2. Description of Related Art

The use of hardening phenolic resin to meet tire manufacturers' requirements to achieve higher hardness compounds is known. It is necessary, however, to incorporate a curative to vulcanize the hardening resin because the unvulcanized hardening phenolic resin becomes soft when the temperature reaches its melting or softening point. A known curative system is a blend of phenolic resin with hexamethylenetetramine. For example, Chemical Abstracts 95:26446m (1981) discloses natural and synthetic rubbers used for tire bead reinforced with filler compositions comprising novolac resin and a hexamethylenetetramine cross-linking agent. Another example is Chemical Abstracts 100:69670u (1984) in which hard rubber products are prepared by vulcanizing compositions comprising diene rubber, cashew nutshell liquid-modified cresol-formaldehyde resins, and hexamethylenetetramine as the curing agent.

Hexamethylenetetramine, however, has had a toxicology problem in the tire industry, and many tire plants prohibit its use. Also, the preblend of phenolic resin with curatives causes problems of short scorch times when the preblended resins used with the masterbatch are discharged at high temperatures from an internal mixer.

U.S. Pat. Nos. 3,256,137, 3,266,970 and 3,281,311 all disclose the use of 1-aza-5-methylol-3,7-di-oxabicyclo (3,3,0) octane as an adhesive between rubber and reinforcing textile materials. None of those references, however, suggests the use of that compound as a resin curing agent as in the present invention.

SUMMARY OF THE INVENTION

This invention relates to tire compositions containing an elastomer, and a resin cured with 1-aza-5-methylol-3,7-dioxabicyclo (3,3,0) octane (AMDO). The present invention also relates to methods of preparing such compositions.

The tire compositions of this invention may be formed by mixing the resin with a rubber/filler masterbatch, followed by addition of the curing agent to the final mix at a lower temperature thereby more easily controlling the scorch or precure. The AMDO curing agent may be added alone, or in conjunction with other compounds which form a curative system. Such other compounds may include sulfur, sulfur donor compounds, sulfur cure accelerators, and combinations thereof.

DETAILED DESCRIPTION OF THE INVENTION

Two-stage phenolic resins, also known as novolac resins, are generally prepared by the acid catalyzed condensation of phenol, or a mixture of phenols with an aldehyde, most often formaldehyde. Such resins cannot be cured without the presence of an additional curing agent.

It has now been discovered that 1-aza-5-methylol-3,7-dioxabicyclo-(3,3,0) octane (AMDO) can be used as the novolac curing agent instead of the toxic hexamethylenetetramine (HMTA). AMDO is a known and commercially available compound which may be synthesized by known means, for example by the reaction of tris (hydroxymethyl) aminomethane with paraformaldehyde. While not wishing to be bound by any particular theory, it is believed that AMDO cross-links the resin by supplying amino methyl or methylene groups to form the cross-links. Since AMDO is an amine, it can act as a catalyst for the cross-linking reaction, but it is expected to be less basic than HMTA and the effect may not be as strong as that of HMTA. Also, AMDO has only one amino group and two formaldehyde derived residues per molecule. This means that on an equal weight basis, AMDO would supply only $\frac{1}{4}$ to $\frac{1}{2}$ as many cross-links as HMTA which has four amino groups and six formaldehyde residues.

Representative of the elastomers which may be employed in the practice of this invention are rubbers, particularly highly unsaturated diene rubbers. Such rubbers will typically possess an iodine number of between about 100 and about 250, although unsaturated rubbers having a higher or a lower (e.g., of 15-100) iodine number may also be employed. Illustrative of the diene rubbers which may be utilized are polymers based on conjugated dienes such as 1,3-butadiene; 2-methyl-1,3-butadiene; 1,3-pentadiene; 2,3-dimethyl-1,3-butadiene; and the like, as well as copolymers of such conjugated dienes with monomers such as styrene, alpha-methylstyrene, acrylonitrile, methacrylonitrile, methyl acrylate, ethyl acrylate, methyl methacrylate, ethyl methacrylate, vinyl acetate and the like. Highly unsaturated rubbers are preferred.

In addition to AMDO, the curative system employed in the present invention may include sulfur and/or a sulfur donor compound, and at least one sulfur cure accelerator.

The sulfur donor compounds which may be employed in conjunction with or in the alternative to sulfur are well known to those skilled in the art of rubber compounding. Illustrative of such sulfur donor compounds are 2-(4-morpholinyldithio)-benzothiazole, tetramethylthiuram disulfide, tetraethylthiuram disulfide, dipentamethylene thiuram hexasulfide, N,N'-caprolactam disulfide and the like.

The sulfur cure accelerators which may be employed include thioureas, such as N,N'-dibutylthiourea, 2-mercaptoimidazoline, tetramethylthiourea and the like; guanidine derivatives, such as N'N'-diphenylguanidine and the like; xanthates, such as zinc dibutylxanthate and the like; dithiocarbamates, such as zinc dibutyldithio carbamate, sodium diethyldithiocarbamate, and the like; thiuramsulfides, such as dipentamethylenethiuram disulfide, dipentamethylenethiuram hexasulfide, tetrabutylthiuram monosulfide, tetramethylthiuram monosulfide, tetraethylthiuram disulfide and the like; heterocyclics, such as mercaptobenzimidazole, mercaptobenzothiazole, 2,2-dibenzothiazoyl disulfide, zinc 2-mercaptobenzothiazole and the like; and sulfenamides, such as N-oxydiethylene-2-benzothiazolesulfenamide, n-t-butylbenzothiazolesulfenamide, N-cyclohexyl-2-benzothiazolesulfenamide, N,N'-diisopropyl-2-benzothiazylsulfenamide and the like. Moreover, mixtures of two or more sulfur cure accelerators may be employed in the curing agent of this invention. The preferred accelerators are thiazoles and sulfenamides, with sulfenamides being particularly preferred.

The sulfur cure accelerator is generally present in amounts of between about 0.1 part and about 5 parts per 100 parts of rubber, with preferably between about 0.3 part and about 3.0 parts of accelerator per 100 parts of rubber being present. Most preferably, between about 0.3 part and about 1.0 part of accelerator per 100 parts of rubber are employed.

The AMDO resin curing agent is generally present in amounts between about 0.5 and about 25 parts per 100 parts of rubber, with preferably between about 0.6 part and about 15 parts of curing agent per 100 parts of rubber being present. Most preferably, between about 0.75 part and about 5.0 parts of curing agent per 100 parts of rubber are employed.

The amount of curing agent in relation to the phenol formaldehyde resin is about 2–35% based on the weight of the resin. As will be recognized by one skilled in the art, the preferred ratio will vary with the particular area of use on the tire.

In addition to the unsaturated rubber and the curing agent described above, the tire composition of this invention may further comprise zinc oxide, reinforcing agents, fillers, processing aids, extender oils, plasticizers, antidegradents, and the like, all of which additional components are well known to those skilled in the rubber art.

Preferably, between about 2 and about 10 parts of zinc oxide per hundred parts of rubber are employed, although amounts in excess of 10 parts may also be employed. Most preferably, between about 3 and about 5 parts of zinc oxide per 100 parts of rubber are present.

EXAMPLES

The following Examples are intended to further illustrate the invention and are not intended to limit the scope of the invention in any manner.

EXAMPLES 1-3 AND COMPARATIVE EXPERIMENT A

Employing the ingredients indicated in Table I (which are listed in parts per hundred of rubber by weight), several rubber compositions were compounded in the following manner: Elastomer, extender oil (aromatic), carbon black (N351—high structure, high abrasion resistance furnace black), zinc oxide, stearic acid, oil modified phenol formaldehyde two-step resin (PFAR) and tackifier resin in the amounts listed in Table I were charged in a Banbury Type B internal mixer. Mixing was continued until the temperature reached approximately 121° C., then the mixing was stopped and the inside of the mixer was swept. Blending was then resumed for three more minutes and the stock was removed from the mixer at a temperature between 121° and 149° C. The compounded stock was then blended on a mill for five minutes. The curative ingredients, including 1-aza-5-methylol-3,7-dioxabicyclo (3,3,0) octane (AMDO), were incorporated in the cooled rubber stocks on the mill, with care being taken not to exceed 105° C. stock temperature. The compounded stocks were then sheeted out and samples were cut for cure. The samples were cured for 10 minutes at 177° C. and their physical properties evaluated. The results of such testing are summarized in Table II below. Examples 1-3 illustrate the present invention; Comparative Example A illustrates compositions outside the scope of the present invention.

TABLE I

| Example or Comparative Experiment | A | 1 | 2 | 3 |
|---|---|---|---|---|
| Natural Rubber[1] | 100 | 100 | 100 | 100 |
| Carbon Black (N-351) | 60 | 60 | 60 | 60 |
| Aromatic Oil (Sundex 790) | 5 | 5 | 5 | 5 |
| Zinc Oxide | 10 | 10 | 10 | 10 |
| Stearic Acid | 2 | 2 | 2 | 2 |
| Tackifier | 2 | 2 | 2 | 2 |
| PFAR[2] | — | 10 | 15 | 20 |
| Accelerator[3] | 0.60 | 0.60 | 0.60 | 0.06 |
| Accelerator[4] | 0.30 | 0.30 | 0.30 | 0.30 |
| Accelerator[5] | 0.25 | 0.25 | 0.25 | 0.25 |
| Sulfur[6] | 5.00 | 5.00 | 5.00 | 5.00 |
| AMDO[7] | — | 2.00 | 3.00 | 4.00 |

REMARKS:
[1]Standard Malaysian Natural Rubber, Hydroxylamine Stabilized, SMR-5CV.
[2]SP 6700 oil modified phenol formaldehyde resin, Sp. Gr. 1.16, Ball and Ring Softening Point 95° C., Schenectady Chemicals, Inc.
[3]2-(Morpholinothio)benzothiazole.
[4]Dithiodimorpholine.
[5]N-(Cyclohexylthio)phthalimide.
[6]Oiled Crystex, 80%.
[7]1-Aza-5-methylol-3,7-dioxabicyclo (3,3,0) octane.

TABLE II

| Example or Comparative Experiment | A | 1 | 2 | 3 |
|---|---|---|---|---|
| Mooney Viscosity (ML 1 + 4 at 100° C.) | 68 | 63 | 59 | 57 |
| Mooney Scorch (MS at 135° C.) 3 Pt. Rise Time | 12.5' | 12' | 11' | 11' |
| Room Temperature | | | | |
| Tensile Strength, MPa | 19.7 | 16.0 | 14.3 | 14.4 |
| Elongation, % at Break | 380 | 330 | 300 | 260 |
| 200% Modulus, MPa | 8.0 | 9.8 | 10.1 | 10.9 |

TABLE II-continued

| Example or Comparative Experiment | A | 1 | 2 | 3 |
|---|---|---|---|---|
| Hardness, Shore A | 71 | 88 | 93 | 94 |
| Tear, Die C, KN/m | 49.0 | 36.8 | 36.8 | 38.5 |
| Tangent Delta (110 Hz) | | | | |
| Room Temperature | .32 | .25 | .23 | .20 |
| 50° C. | .26 | .24 | .21 | .20 |
| 75° C. | .26 | .24 | .21 | .21 |
| Dynamic Modulus, E* (Kg/cm$^2$) | | | | |
| Room Temperature | 90 | 185 | 320 | 590 |
| 50° C. | 73 | 179 | 260 | 410 |
| 75° C. | 61 | 171 | 230 | 390 |

The above data indicate the desirable significant increase in the modulus, Shore A hardness, strength and composite dynamic modulus over Comparative Experiment A. Ninety plus (90+) Shore A hardness can be achieved with the addition of 15 PHR of PFAR and 3 PHR of AMDO. Also, lower Mooney Viscosity can be obtained with the addition of PFAR.

EXAMPLES 4-5 AND COMPARATIVE EXPERIMENT B

Employing the mixing method described in the Examples above, three additional rubber blends were prepared from a basic recipe for a passenger tire tread compound. The conventional tread compound contained 75/25 emulsion styrene butadiene/butadiene (E-SBR/BR), extender oil (aromatic oil), carbon black (N-234, an intermediate super abrasion furnace black), zinc oxide, stearic acid and tackifier in the amounts listed in Table III. Comparative Experiment B did not contain PFAR/AMDO. Example 4 contained 5 PHR of PFAR and 1 PHR of AMDO and Example 5 contained 10 PHR of PFAR and 2 PHR of AMDO, as shown in Table III. A thiocarbamylsulfenamide/2-(morpholinothio)benzothiazole/sulfur curing system was used to vulcanize the conventional high modulus tread compounds. One cure time and temperature was used, namely 10 minutes at 177° C. This higher temperature was utilized to simulate the currently used curing temperature in the tire industry. The completely mixed compounds were measured for Mooney Viscosity at 100° C. and Mooney Scorch at 132°, and observed in the Oscillating Disk Cure Meter at 177° C. All the cured samples were tested for unaged and aged stress/strain data, and Rheometric measurements were performed for determining viscoelastic properties. The results of such testing are summarized in Table IV below.

TABLE III

| Example or Comparative Experiment | B | 4 | 5 |
|---|---|---|---|
| E-SBR[1] | 75 | 75 | 75 |
| PBD1203[2] | 25 | 25 | 25 |
| Carbon Black (N-234) | 55 | 55 | 55 |
| Aromatic Oil (Sundex 790) | 20 | 20 | 20 |
| Zinc Oxide | 3 | 3 | 3 |
| Stearic Acid | 1.5 | 1.5 | 1.5 |
| Wax (Sunproof Improved) | 0.5 | 0.5 | 0.5 |
| PFAR[3] | — | 5.0 | 10.0 |
| Accelerator[4] | 1.0 | 1.0 | 1.0 |
| Accelerator[5] | 0.5 | 0.5 | 0.5 |
| Sulfur[6] | 1.5 | 1.5 | 1.5 |

TABLE III-continued

| Example or Comparative Experiment | B | 4 | 5 |
|---|---|---|---|
| AMDO[7] | — | 1.0 | 2.0 |

REMARKS:
[1] Styrene Butadiene Rubber 1500 < 24,5% Bound Styrene, Mooney Viscosity (ML 1 + 4 at 100° C.) = 52.
[2] Polybutadiene, solution polymerized, high % cis content, Mooney Viscosity (ML 1 + 4 at 100° C.) = 40.
[3] Sp 6700 oil modified phenol formaldehyde resin, Sp. Gr. 1.16, Ball and Ring Softening Point 95° C., Schenectady Chemicals, Inc.
[4] N,N'-bis (oxydiethylene) thiocarbamylsulfenamide (CURE-RITE 18).
[5] 2-Morpholinothiobenzothiazole.
[6] Oiled Crystex, 80%.
[7] 1-Aza-5-methylol-3,7-dioxabicyclo (3,3,0) octane.

TABLE IV

| Example or Comparative Experiment | B | 4 | 5 |
|---|---|---|---|
| Mooney Viscosity (ML 1 + 4 at 100° C.) | 56 | 55 | 58 |
| Mooney Scorch (MS at 135° C.) 3 Pt. Rise Time | 43' | 23' | 14' |
| Room Temperature | | | |
| Tensile Strength, MPa | 22.1 | 22.5 | 18.5 |
| Elongation, % at Break | 500 | 690 | 810 |
| 300% Modulus, MPa | 11.5 | 7.0 | 5.2 |
| Hardness, Shore A | 60 | 69 | 80 |
| Tear, Die C, KN/m | | | |
| 121° C. | | | |
| Tensile Strength, MPa | 4.0 | 4.9 | 5.0 |
| Elongation, % at Break | 390 | 500 | 590 |
| 300% Modulus, MPa | 3.2 | 2.2 | 1.9 |
| Tear, Die C, KN/m | 14.7 | 23.6 | 21.2 |
| Cure Meter (ASTM d2084-87) | | | |
| 177@c TS$_1$ | 2.68 | 2.10 | 1.87 |
| 177° c. TC$_{90}$ | 6.10 | .5.03 | 10.20 |
| Tangent Delta (10 Hz) | | | |
| 30° C. | .207 | .170 | .131 |
| 50° C. | .194 | .169 | .143 |
| 75° | .180 | .173 | .160 |
| 100° C. | .165 | .181 | .183 |
| Dynamic Modulus, G*(kg/cm$^2$) | | | |
| 30° C. | 76.3 | 124.0 | 251.0 |
| 50° C. | 63.4 | 104.6 | 213.5 |
| 75° C. | 53.4 | 87.1 | 170.6 |
| 100° C. | 48.3 | 75.7 | 137.5 |

The above data show a significant increase in elongation at break, hot tear strength, Shore A Hardness, hot tensile strength and composite dynamic modulus in the compositions employed in the tires of this invention. Higher elongation at break may contribute to solving tread tearing problems when cured tires are released from the mold. Shorter elongation tread compounds have tread tearing problems when releasing them from all season tire molds.

EXAMPLES 6-8 AND COMPARATIVE EXPERIMENT C

Again, employing the mixing method described in Examples 1-3 and Comparative Experiment A, four additional rubber blends were prepared. In order to obtain higher modulus and lower rolling resistant tread compounds, Duradene 750, which is high molecular weight solution SBR, and Cariflex 1210, a linear solution SBR, were used to lower tangent delta and increase dynamic modulus of the tread compounds. A diphenylguanidine/N-t-butyl-2-benzothiazolesulfenamide/sulfur curing system was used to vulcanize the experimental solution SBR tread compound, which contained extender oil (naphthenic oil), carbon black (N-234), zinc oxide, stearic acid and tackifier in the amount listed in Table V. Comparative Experiment C did not contain PFAR/AMDO. Example 6 contained 3 PHR of PFAR and 0.75 PHR of AMDO; Example 7 contained 6 PHR of PFAR and 1.5 PHR of AMDO, and Example 8 contained 9 PHR of PFAR and 2.25 PHR of AMDO. Two cure times and temperature were utilized, namely, 10 minutes at 177° C. and 20 minutes at 150° C. The higher temperature was utilized to simulate the currently used curing temperature in the tire industry, and the low temperature was used to better achieve the optimum cure time and obtain the maximum possible physical properties. The Mooney Viscosity data at 100° C., the Mooney Scorch data at 132° C. and Cure Meter data at 155° C. and 177° C. were determined. All cured samples were tested for tensile strength, elongation at break, modulus, tear strength and viscoelastic properties using the Rheometrics instrument. The results of such testing are summarized in Table VI below.

TABLE V

| Example or Comparative Experiment | C | 6 | 7 | 8 |
|---|---|---|---|---|
| S-SBR[1] | 35.00 | 35.00 | 35.00 | 35.00 |
| S-SBR[2] | 68.75 | 68.75 | 68.75 | 68.75 |
| Natural Rubber[3] | 15.00 | 15.00 | 15.00 | 15.00 |
| Carbon Black (N-234) | 55.00 | 55.00 | 55.00 | 55.00 |
| Naphthenic Oil | 1.25 | 1.25 | 1.25 | 1.25 |
| Zinc Oxide | 3.00 | 3.00 | 3.00 | 3.00 |
| Stearic Acid | 1.50 | 1.50 | 1.50 | 1.50 |
| Wax (Sunproof Improved) | 0.50 | 0.50 | 0.50 | 0.50 |
| Antiozonant[4] | 1.00 | 1.00 | 1.00 | 1.00 |
| PFAR[5] | — | 3.00 | 6.00 | 9.00 |
| Accelerator[6] | 1.00 | 1.00 | 1.00 | 1.00 |
| Accelerator[7] | 0.40 | 0.40 | 0.40 | 0.40 |
| Accelerator[8] | 0.50 | 0.50 | 0.50 | 0.50 |
| Sulfur[9] | 1.80 | 1.80 | 1.80 | 1.80 |
| AMDO[10] | — | 0.75 | 1.50 | 2.25 |

REMARKS:
[1]Styrene Butadiene Rubber, a linear solution SBR, Cariflex S-1210, H. Muehlstein Co., Inc.
[2]Styrene Butadiene Rubber, a high molecular weight solution SBR, oil extended (18.5 parts), Duradene 750, Firestone Synthetic Rubber Co.
[3]Standard Malaysian Natural Rubber, Hydroxylamine Stabilized, SMR-5CV.
[4]N-Phenyl-N'(1,3-dimethylbutyl)-p-phenylenediamine, Flexzone ® 7L, Uniroyal Chemical Co., Inc.
[5]Sp 6700 oil modified phenol formaldehyde resin, Sp. Gr. 1.16, Ball and Ring Softening Point 95° C., Schenectady Chemicals, Inc.
[6]N-t-Butyl-2-benzothiazolesulfenamide, Delac ® NS, Uniroyal Chemical Co., Inc.
[7]Diphenylguanidine.
[8]Dithiodimorpholine, Naugex SD-1, Uniroyal Chemical Co., Inc.
[9]Oiled Crystex, 80%.
[10]1-Aza-5-methylol-3,7-dioxabicyclo (3,3,0) octane.

TABLE VI

| Example or Comparative Experiment | C | 6 | 7 | 8 |
|---|---|---|---|---|
| Mooney Viscosity (ML 1 + 4 at 100° C.) | 68 | 72 | 72 | 74 |
| Mooney Scorch (MS at 135° C.) 3 Pt. Rise Time | 18' | 15' | 16' | 12' |
| Room Temperature | | | | |
| Tensile Strength, MPa | 25.7 | 23.0 | 24.8 | 24.1 |
| Elongation, % at Break | 530 | 560 | 590 | 640 |
| 300% Modulus, MPa | 10.7 | 9.7 | 9.3 | 8.9 |
| Tear, Die C, KN/m | 35.0 | 35.0 | 35.0 | 35.0 |
| Cure Meter (ASTM D2084-87) | | | | |
| 177° C. ts$_1$ | 2.10 | 1.80 | 1.85 | 1.45 |
| 177° C. tc$_{90}$ | 4.07 | 3.80 | 4.00 | 9.20 |
| 150° C. ts$_1$ | 7.00 | 5.70 | 5.00 | 3.25 |
| 150° C. tc$_{90}$ | 14.90 | 15.50 | 17.50 | 27.00 |
| Tangent Delta (10 Hz) | | | | |
| Room Temperature | .160 | .151 | .145 | .136 |
| 50° C. | .148 | .141 | .135 | .128 |
| 75° C. | .137 | .132 | .133 | .128 |
| 100° C. | .128 | .133 | .133 | .137 |
| Composite Modulus $|G^*|$ (Kg/cm$^2$) | | | | |
| Room Temperature | 55.20 | 86.29 | 83.89 | 133.80 |
| 50° C. | 46.50 | 71.79 | 71.56 | 113.60 |
| 75° C. | 39.37 | 62.69 | 62.50 | 99.18 |
| 100° C. | 35.23 | 58.05 | 56.32 | 86.79 |

The above results once again demonstrate the superior properties of the tire compositions of this invention. The lower tangent delta provides lower rolling resistance with linear and high molecular weight solution ABR/PFAR/AMDO. The higher dynamic modulus, $|G^*| = \sqrt{G'^2 + G''^2}$ (G' = storage modulus, G'' = shear loss modulus) of the tread compound of the present invention provides a higher cornering coefficient which is required for better handling tires.

We claim:

1. A tire composition comprising a rubber having an iodine number of at least about 15, and a two-stage phenolic resin which has been cured with 1-aza-5-methylol-3,7-dioxabicyclo-(3,3,0) octane.

2. The composition of claim 1 wherein the resin is an oil modified phenol formaldehyde two-step resin.

3. The composition of claim 1 further comprising a compound selected from the group consisting of sulfure, a sulfur donor compound, a sulfur cure accelerator, and combinations thereof.

4. The composition of claim 3 wherein the sulfur donor compound is selected from the group consisting of 2-(4-morpholinyldithio)-benzothiazole, tetramethylthiuram disulfide, tetraethylthiuram disulfide, dipentamethylene thiuram hexasulfide, and N,N'-caprolactam disulfide.

5. The composition of claim 3 wherein the sulfur cure accelerator is selected from the group consisting of thioureas, guanidine derivatives, xanthates, dithio carbamates, thiuram sulfides, heterocyclics, sulfenamides and mixtures thereof.

6. The composition of claim 1 further comprising additives selected from the group consisting of zinc oxide, reinforcing agents, fillers, processing aids, extender oils, plasticizers, antidegradents, and combinations thereof.

7. The composition of claim 1 wherein the curing agent is present in between about 0.5 and about 25 parts per 100 parts of rubber, and between about 2% and 35% based on the weight of the resin, and further comprising a sulfur cure accelerator in an amount between about 0.1 to about 5 parts per 100 parts of rubber.

8. A method for preparing a tire composition which comprises curing a mixture of a rubber having an iodine number of at least about 15, and a two-stage phenolic resin with 1-aza-5-methylol-3,7-dioxabicyclo (3,3,0) octane.

9. The method of claim 8 wherein the resin is an oil modified phenol formaldehyde two-step resin.

10. The method of claim 8 further comprising adding a compound selected from the group consisting of sulfur, a sulfur donor compound, a sulfur cure accelerator and combinations thereof to the mixture prior to curing.

11. The method of claim 10 wherein the sulfur donor compound is selected from the group consisting of 2-(4-morpholinyldithio)-benzothiazole, tetramethylthiuram disulfide, tetraethylthiuram disulfide, dipentamethylene thiuram hexasulfide, and N,N'-caprolactam disulfide.

12. The method of claim 10 wherein the sulfur cure accelerator is selected from the group consisting of thioureas, guanidine derivatives, xanthates, dithio carbamates, thiruam-sulfides, heterocyclics, sulfenamides and mixtures thereof.

13. The method of claim 8 further comprising adding to the mixture an additive selected from the group consisting of zinc oxide, reinforcing agents, fillers, processing aids, extender oils, plasticizers, antidegradents, and combinations thereof.

14. The method of claim 8 wherein the curing agent is present in between about 0.5 and about 25 parts per 100 parts of rubber, and between about 2% and 35% based on the weight of the resin, and wherein the mixture further comprises a sulfur cure accelerator in an amount between about 0.1 to about 5 parts per 100 parts of rubber.

* * * * *